United States Patent [19]

Danielson et al.

[11] 4,311,529

[45] Jan. 19, 1982

[54] TINTED OPAL GLASS

[75] Inventors: Paul S. Danielson; John E. Megles, Jr., both of Corning, N.Y.

[73] Assignee: Corning Glass Works, Corning, N.Y.

[21] Appl. No.: 160,388

[22] Filed: Jun. 17, 1980

[51] Int. Cl.³ .............................................. C03C 3/04
[52] U.S. Cl. ...................................... 501/32; 501/59; 501/64
[58] Field of Search ................. 106/52, 54, 73.1, 39.6

[56] References Cited

U.S. PATENT DOCUMENTS 3,673,049  6/1972  Giffen, et al. ...................... 106/54 X
3,681,098  8/1972  Dumbaugh et al. .................. 106/52

OTHER PUBLICATIONS

Weyl, W. A., *Colored Glasses*, pub. by Pall Mall, London (1951) p. 200; pp. 212-213; 232-233.

*Primary Examiner*—Helen M. McCarthy
*Attorney, Agent, or Firm*—Clinton S. Janes, Jr.

[57] ABSTRACT

The present invention is concerned with the production of spontaneous opal glasses which, after thermal tempering, demonstrate a dense coloration ranging from ivory through yellow-beige to tan to a grayish-brown appearance, consisting essentially, by weight on the oxide basis, of 8-9% $Na_2O$, 2-2.5% $K_2O$, 5-6.5% CaO, 8-10% ZnO, 1-2% $B_2O_3$, 10-11% $Al_2O_3$, 3-4% F, 0.005-0.1% NiO, 0-2% $CeO_2$, 0-4% $TiO_2$, 0.5-6% $CeO_2+TiO_2$, 0-0.5% $As_2O_3$, and 57-61% $SiO_2$.

2 Claims, No Drawings

4,311,529

TINTED OPAL GLASS

BACKGROUND OF THE INVENTION

Opal glasses have been known to the glass art for many years. Such glasses contain a second phase dispersed therewithin which exhibits a refractive index which differs from that of the glassy matrix. It is this difference in refractive index which imparts opacification to the glass body. Opal glasses have been utilized extensively in such consumer product applications as culinary ware and tableware.

There are two broad types of opal glasses based upon the manner of manufacture thereof. The first group has been termed spontaneous opacifiable glasses or "spontaneous opals". Such glasses develop opacity as the molten batch is cooled and shaped into a glass article. The second group has been termed thermally opacifiable glasses or "reheat opals". Those glasses require the application of a subsequent heat treatment to a glass body to effect opacification therein. Since the cost of manufacture is a significant factor in determining the selection of an opal glass for a particular utility, it is apparent that "spontaneous opals" are preferred to "reheat opals".

The opacity observed in "spontaneous opals" is commonly generated through the growth of crystals therein as the molten batch is cooled and shaped into a glass article of a desired configuration. Customarily, the crystal content developed in situ is less than 10% by volume of the body such that the physical properties of the glass, other than optical transmission, will be very slightly affected, if at all.

Whereas opal glasses have been and are presently marketed in the as-formed state, i.e., the undecorated state, consumer interest has greatly increased for articles having decorations thereon. For example, in culinary ware and tableware, the consumer has demanded products having an aesthetically pleasing appearance coupled with long time service capability. Thus, such products are subject to chemical and mechanical abuse resulting from handling, food contact, and, particularly, from contact with dishwasher detergents.

The tinting of glass to impart an integral color thereto has been practiced in the art for a long time. *Coloured Glasses*, W. A. Weyl, Dawson's of Pall Mall, London, 1959, is a classic text which surveys the wide variety of ions which can be used to impart colors to glass and suggests mechanisms by which such colors are generated. Tinting glass has the obvious advantage in that the color exists throughout the body of the article and will not be removed via surface abuse.

Spontaneously opacifiable glass bodies wherein alkali metal fluoride and/or alkaline earth metal fluoride crystals comprise the opacifying phase are well-recognized in the glass art. Such bodies exhibit a dense, milky white appearance and have been employed extensively in the formation of culinary ware and tableware.

SUMMARY OF THE INVENTION

The instant invention is founded in the discovery that a series of tinted, spontaneous opal glasses, wherein calcium fluoride ($CaF_2$) crystals constitute the opacifying phase, can be developed ranging in color from ivory to yellow-beige to tan to grayish-brown depending upon additions of nickel oxide (NiO), titanium oxide ($TiO_2$) and cerium oxide ($CeO_2$) in controlled amounts. The incorporation of NiO alone results in a brownish-tan coloration which demonstrates a significant neutral gray character. The inclusion of $CeO_2$ and $TiO_2$ in the composition adds a yellow component to the color which, in turn, minimizes the grayish tint resulting from the nickel. The relative amounts of $CeO_2$ and $TiO_2$ can be adjusted to provide colors ranging from light lemon yellow to "butterscotch" amber. The addition of one or both of those colorants, along with NiO, to the opal glass compositions defined below yields colorations resembling those observed in earthenware and stoneware ceramic materials.

An important additional factor which must be taken into consideration in the selection of colorant levels is the sensitivity of the coloring oxides, particularly nickel ions, to the thermal history of the articles produced from the tinted glass. Culinary ware and tableware prepared from opal glasses are conventionally thermally tempered to enhance the mechanical strength and thermal shock resistance thereof. It is well known that in the thermal tempering process certain of the high temperature characteristics of the glass are "frozen in" upon rapid cooling. This circumstance is especially true in the case of glasses tinted with nickel ions where the difference in color between the thermally tempered articles and annealed (slow cooled) articles is quite substantial. Consequently, it is necessary to employ quantities of the coloring materials which will produce the desired tint in the final article, i.e., after the article has been thermally tempered.

The inventive glass compositions consist essentially, expressed in weight percent on the oxide basis, of 8-9% $Na_2O$, 2-2.5% $K_2O$, 5-6.5% CaO, 8-10% ZnO, 1-2% $B_2O_3$, 10-11% $Al_2O_3$, 3-4% F, 0.005-0.1% NiO, 0-2% $CeO_2$, 0-4% $TiO_2$, 0.5-6% $CeO_2 + TiO_2$, and 57-61% $SiO_2$. Close control of the individual constituents is necessary. For example, higher levels of the colorants, especially the $CeO_2$ and $TiO_2$, can alter the desired chemical and physical properties of the glass. The base glass components must be held within the prescribed limits to assure good melting and forming qualities along with the other physical characteristics required in a spontaneous opal glass. Hence, when the fluoride level falls below 3%, a loss of opacity is hazarded whereas amounts above 4% lead to corrosion of mold materials utilized in shaping the glass into desired ware geometries. The defined quantities of CaO, ZnO, $Na_2O$, and $K_2O$ influence the absorption and resulting glass color imparted by the nickel ions and, hence, must be carefully controlled. The preferred compositions contain about 0.02% NiO, 0.5% $CeO_2$, and 0.25% $TiO_2$.

DESCRIPTION OF THE PREFERRED EMBODIMENTS

The following table reports glass compositions, expressed in parts by weight on the oxide basis, coming within the parameters of the present invention. Inasmuch as it is not known with which cation(s) the fluorine is combined, it is merely recorded as fluoride (F) in accordance with conventional glass analysis procedure. Moreover, because the sum of the glass constituents totals approximately 100, the values recited in the table can, for all practical purposes, be deemed to be tabulated in terms of weight percent. In general, the volatilization of fluorine during melting of the batch materials is quite high, perhaps as great as 50%. However, the addition of excess fluorine-containing components to the batch to compensate for such loss, and the need for taking special precautions in melting procedure to reduce this loss, are well-recognized by the glass technologist. Arsenic oxide is present in amounts up to about 0.5% to perform its customary role as a fining agent.

The actual batch ingredients may comprise any materials, either the oxides or other compounds, which, when melted together, will be converted into the desired oxides in the proper proportions. The fluorine will commonly be added in the form of sodium silicofluoride or fluorspar ($CaF_2$). Whereas the succeeding description reflects laboratory scale melting, it will be appreciated that the recited compositions could be utilized in large scale commercial glass melting units.

The batch constituents for the exemplary compositions were compounded, ballmilled together to aid in securing a homogeneous melt, and then placed into platinum crucibles. The crucibles were covered, introduced into a furnace operating at about 1450°–1550° C., and the batches melted for about four hours. The melts were cast into steel molds to produce slabs having dimensions of about 6"×6"×½" and the slabs immediately transferred to an annealer operating at about 500°–550° C.

TABLE I

|  | 1 | 2 | 3 | 4 | 5 | 6 |
|---|---|---|---|---|---|---|
| $SiO_2$ | 58.33 | 58.26 | 59.18 | 59.79 | 59.39 | 59.64 |
| $Al_2O_3$ | 10.48 | 10.28 | 10.43 | 10.54 | 10.54 | 10.54 |
| $Na_2O$ | 8.61 | 8.36 | 8.24 | 8.32 | 8.32 | 8.32 |
| $K_2O$ | 2.09 | 2.11 | 2.15 | 2.17 | 2.17 | 2.17 |
| CaO | 6.04 | 5.86 | 5.21 | 5.26 | 5.26 | 5.26 |
| ZnO | 8.90 | 8.74 | 9.5 | 9.59 | 9.50 | 9.50 |
| $B_2O_3$ | 1.36 | 1.36 | 1.4 | 1.41 | 1.41 | 1.41 |
| $As_2O_3$ | 0.4 | 0.4 | 0.4 | 0.4 | 0.4 | 0.4 |
| F | 3.1 | 3.0 | 3.4 | 3.43 | 3.43 | 3.43 |
| NiO | 0.04 | 0.03 | 0.02 | 0.02 | 0.02 | 0.02 |
| $CeO_2$ | 0.98 | 0.96 | 0.50 | 0.51 | 0.50 | 0.50 |
| $TiO_2$ | 0.98 | 1.92 | 1.0 | — | 0.50 | 0.25 |

Table II records reflectance CIE colors exhibited by 4 mm thick, ground and polished samples of Examples 1–6 utilizing Illuminant C, after the samples had been subjected to thermal tempering.

TABLE II

|  | 1 | 2 | 3 | 4 | 5 | 6 |
|---|---|---|---|---|---|---|
| x | 0.3346 | 0.3442 | 0.3412 | 0.3350 | 0.3400 | 0.3376 |
| y | 0.3474 | 0.3576 | 0.3484 | 0.3393 | 0.3446 | 0.3433 |
| y | 46.2 | 48.1 | 51.2 | 51.0 | 49.0 | 50.1 |

Example 6 of Table I is the most preferred composition.

We claim:

1. A spontaneous opal glass, wherein $CaF_2$ crystals constitute the opacifying phase, which, after thermal tempering, exhibits a dense coloration ranging from ivory through yellow-beige to tan to a grayish-brown appearance, consisting essentially, expressed in weight percent on the oxide basis, of 8–9% $Na_2O$, 2–2.5% $K_2O$, 5–6.5% CaO, 8–10% ZnO, 1–2% $B_2O_3$, 10–11% $Al_2O_3$, 3–4% F, 0.005–0.1% NiO, 0–2% $CeO_2$, 0–4% $TiO_2$, 0.5–6% $CeO_2+TiO_2$, 0–0.5% $As_2O_3$, and 57–61% $SiO_2$, said coloration depending upon the quantities of NiO, $CeO_2$, and $TiO_2$ utilized.

2. A spontaneous opal glass according to claim 1 consisting essentially, expressed in weight percent on the oxide basis, of about $SiO_2$: 59.64
$Al_2O_3$: 10.54
$Na_2O$: 8.32
$K_2O$: 2.17
CaO: 5.26
ZnO: 9.50
$B_2O_3$: 1.41
$As_2O_3$: 0.4
F: 3.43
NiO: 0.02
$CeO_2$: 0.50
$TiO_2$: 0.25.

* * * * *